US008022874B2

(12) United States Patent
Frieaizen

(10) Patent No.: US 8,022,874 B2
(45) Date of Patent: Sep. 20, 2011

(54) METHOD AND SYSTEM FOR DETECTING SIGNAL SOURCES IN A SURVEILLANCE SPACE

(75) Inventor: Moshe Frieaizen, Halamish (IL)

(73) Assignee: Elta Systems Ltd., Ashdod (IL)

( * ) Notice: Subject to any disclaimer, the term of this patent is extended or adjusted under 35 U.S.C. 154(b) by 218 days.

(21) Appl. No.: 12/514,523

(22) PCT Filed: Oct. 31, 2007

(86) PCT No.: PCT/IL2007/001329
§ 371 (c)(1),
(2), (4) Date: Aug. 13, 2009

(87) PCT Pub. No.: WO2008/059476
PCT Pub. Date: May 22, 2008

(65) Prior Publication Data
US 2010/0231455 A1    Sep. 16, 2010

(30) Foreign Application Priority Data
Nov. 12, 2006    (IL) .......................................... 179186

(51) Int. Cl.
*G01S 5/04* (2006.01)

(52) U.S. Cl. ..................................................... 342/445
(58) Field of Classification Search ................... 342/445
See application file for complete search history.

(56) References Cited

U.S. PATENT DOCUMENTS

| 4,802,149 A * | 1/1989 | Moore ........................... 367/100 |
| 5,327,144 A | 7/1994 | Stilp et al. |
| 5,444,451 A | 8/1995 | Johnson et al. |
| 5,585,803 A | 12/1996 | Miura et al. |
| 6,278,406 B1 | 8/2001 | Kuwahara |
| 6,446,025 B1 | 9/2002 | Nakamura et al. |
| 2006/0227050 A1 | 10/2006 | Vaughn |
| 2007/0200760 A1 | 8/2007 | Hjelmstad |

FOREIGN PATENT DOCUMENTS

| EP | 0 693 693 B1 | 11/2001 |
| EP | 1 850 147 A1 | 10/2007 |
| WO | WO 2006/067869 A1 | 6/2006 |

OTHER PUBLICATIONS

Chan et al.; "Efficient Implementation of Wideband Multibeam Forming Network Using Sopot Coefficients and Multiplier Block;"*14th International Conference on Digital Signal Processing*; 2002; pp. 243-246; vol. 1.
Lie et al.; "Wideband Polynomial-Phase Parameter Estimation in Sensor Array;" *Signal Processing and Information Technology*; 2003; pp. 314-317.
International Search Report for International Application No. PCT/IL2007/001329, issued on Mar. 4, 2008.

* cited by examiner

*Primary Examiner* — Harry Liu
(74) *Attorney, Agent, or Firm* — Oliff & Berridge, PLC

(57) ABSTRACT

A respective electromagnetic parameter and spatial disposition of an unknown number of signal sources in a surveillance space simultaneously bombarded by multiple signals are determined by receiving multiple signals at each of a plurality of widebeam, wideband antennas equally spaced apart in a linear array. Respective antenna signals are simultaneously sampled to generate a two-dimensional array of values. A two-dimensional Fourier transform is computed whose peaks satisfy one or more predetermined criteria, each peak being indicative of a signal source in the surveillance space, whereby the location of the peak in the Fourier transform Fjk indicates the frequency and the azimuth of the respective signal source and the amplitude of the peak indicates the amplitude of the signal source. When implemented using two mutually perpendicular arrays of receiving antennas, an additional Fourier transform of the two-dimensional Fourier transform generates, for each identified emitter, independent azimuth and elevation angles.

19 Claims, 3 Drawing Sheets

METHOD AND SYSTEM FOR DETECTING SIGNAL SOURCES IN A SURVEILLANCE SPACE

FIELD OF THE INVENTION

This invention relates to surveillance systems, and more specifically to methods for determining parameters of a source of electromagnetic radiation.

BACKGROUND OF THE INVENTION

Surveillance systems are used for continuous detection and tracking of signals emitted by a signal source in a region of space under surveillance. The signals are received by an antenna array directed towards the space under surveillance and processed to determine signal parameters such as frequency and azimuth direction. The signal source may be an active stationary or moving transmitter that transmits EM radiation, such as radio transmitter, wireless telephone and so on. It may also be a passive source corresponding to a reflected signal, such as a signal that originates from an active transmitter and is picked up and subsequently reflected by a radar antenna or any other radiation source. So far as the present invention is concerned, it is immaterial whether the signal source is active or passive. The signals received by the receiving antenna array are processed so as to distinguish genuine signals from noise and to determine the frequency, amplitude and direction of each detected signal.

A problem with hitherto proposed detection systems is that detection of weak signals is difficult, thus imposing severe restrictions on the maximum distance from the antenna array for which signal detection is possible. Moreover, known systems are unable to distinguish between signals of identical frequency originating from signal sources that are spatial disposed in different directions.

Chan S. C. et al.: "Efficient Implementation of Wideband Multibeam Forming Network Using SOPOT Coefficients and Multiplier Block" discloses an efficient implementation structure of the wideband multi-beam firming network in beamspace adaptive array for wideband signals.

SUMMARY OF THE INVENTION

The present invention provides a method and system for determining electromagnetic properties of a signal source such as frequency and azimuth angle detected in a space under surveillance. The method and system according to the invention may be used when neither the number of signal sources, nor the frequency and direction of the signal sources are known a priori to the system.

In accordance with a first aspect of the invention there is provided a method for determining a respective electromagnetic parameter and spatial disposition of one or more signal sources in a surveillance space simultaneously bombarded by multiple signals, the method comprising:

receiving said multiple signals at each of a plurality of widebeam, wideband antennas that are spaced apart in a linear array by equal mutual spacings;

simultaneously sampling the respective signals $A_{i,n}$ of each of the antennas at a sampling rate to generate a two-dimensional array of sampled values $S_{i,n}$, where $S_{i,n}$ is the n-th sample of the signal $A_{i,n}$ received at an antenna i;

calculating a two-dimensional Fourier transform $F_{jk}$ of the array $S_{i,n}$; and identifying peaks in the Fourier transform satisfying one or more predetermined criteria, a peak satisfying the predetermined criteria being indicative of a signal source in the surveillance space, whereby the location of the peak in said two-dimensional Fourier transform $F_{jk}$ indicates the frequency and the azimuth of the respective signal source and the amplitude of the peak indicates the amplitude of the signal source.

In accordance with a second aspect of the invention there is provided a system for determining a respective electromagnetic parameter and spatial disposition of one or more signal sources in a surveillance space simultaneously bombarded by multiple signals, the system comprising:

an antenna array having a plurality of spaced apart widebeam, wideband antennas that are spaced apart in a linear array by equal mutual spacings and are configured to receive said multiple signals; and a processor coupled to the antenna array and being configured to:

sample the respective signals $S_{i,n}$ received by each of the antennas at a sampling rate to generate a two-dimensional array of sampled values $S_{i,n}$, where $S_{i,n}$ is the n-th sample of the signal received at a detector i;

calculate a two-dimensional Fourier transform $F_{jk}$ of the array $S_{i,n}$; and identify peaks in the Fourier transform satisfying one or more predetermined criteria, a peak satisfying the predetermined criteria being indicative of a signal source in the surveillance space, whereby the location of the peak in said two-dimensional Fourier transform $F_{jk}$ indicates the frequency and the azimuth of the respective signal source and the amplitude of the peak indicates the amplitude of the signal source.

The system of the invention comprises an array of antenna elements. Signal sources in the surveillance space radiate electromagnetic (EM) signals towards the receiving antenna array which collects the radiated signals. The frequency f of the EM radiation may or may not be known to the system. The antenna array must, of course, be capable of receiving the signals and to this end must be tuned to a frequency band in which the signal sources are located and must be adapted to receive a signal over a wide angle of view that contains all the signal sources. The distance traveled by the EM radiation from the object to the antenna array is in general different for each receiving antenna in the array. The signals arriving at each of the receiving antennas are thus out of phase from each other, the phase difference being a function of the incremental distance that each signal travels before being received. The signals are sampled to yield a two dimensional array of sampled values that is input to an azimuth determination processing stage. The azimuth determination processing involves calculating a two dimensional Fourier transform of the input array. The Fourier transform, has one index (or "bin number") j that is a function of the frequency f of the EM radiation, and various parameters of the system. The other bin number of the Fourier transform, k, is a function of the frequency f, the azimuth angle θ and parameters of the system.

The Fourier transform is scanned for peaks satisfying predetermined criteria in order to identify signals in the surveillance space and to segregate these signals from clutter. For each received signal, if the frequency f of its EM radiation is unknown to the system, the frequency f is determined from the bin number j of the peak. The azimuth angle θ of the received signal is then determined from the bin number k of the peak and the frequency f.

BRIEF DESCRIPTION OF THE DRAWINGS

In order to understand the invention and to see how it may be carried out in practice, some embodiments will now be described, by way of non-limiting example only, with reference to the accompanying drawings, in which.

DETAILED DESCRIPTION OF EMBODIMENTS

Figure 1:
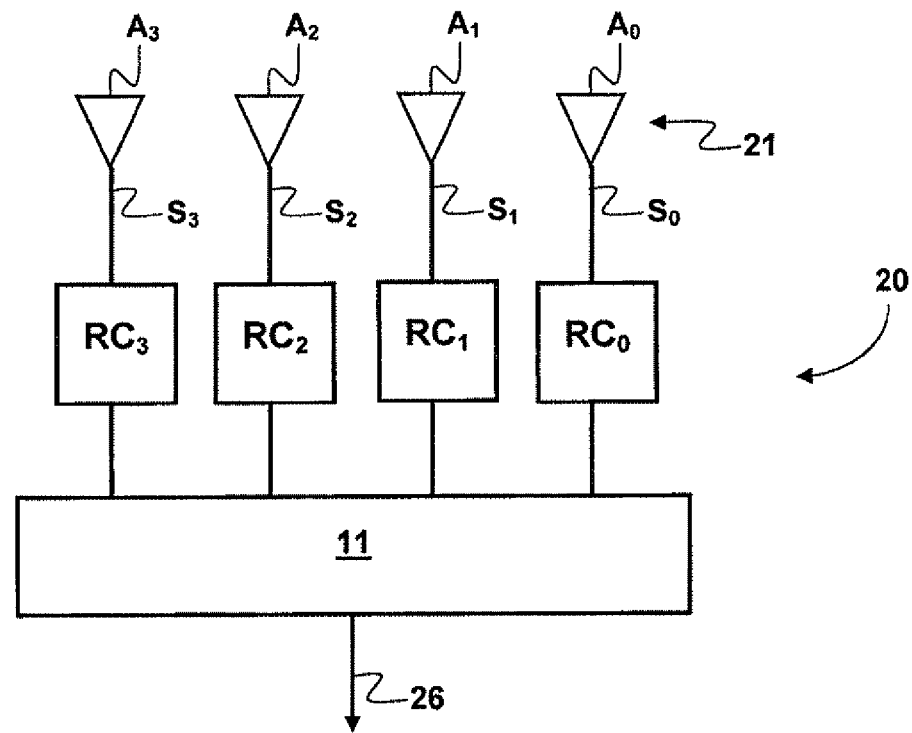
FIG. 1 shows a block diagram of a surveillance system configured to determine the azimuth angle and frequency of a signal source in accordance with an embodiment of the invention.

The present invention provides a system and method for determining the azimuth angle and signal frequency of a signal source that emits a signal, which is detected in a space under surveillance. FIG. 1 is a block diagram schematically showing the hardware components and signal processing stages of a detection system 20 in accordance with one embodiment of the invention. The system 20 comprises an antenna array 21 consisting of a plurality of wideband antenna elements A. Four antenna elements $A_0$ to $A_3$ are shown in FIG. 1. This is by way of example only, and although the invention may be carried out using any number of receiving antennas greater than 1, the greater the number of receiving antennas in the array 21, the greater is the accuracy and sensitivity of the detection and consequently of the azimuth determination. Signal sources in the surveillance space, such as transmitters 22 to 25 (shown in FIG. 2) radiate electromagnetic (EM) pulses towards the receiving antenna array 21 which collects the received data.

Figure 2:
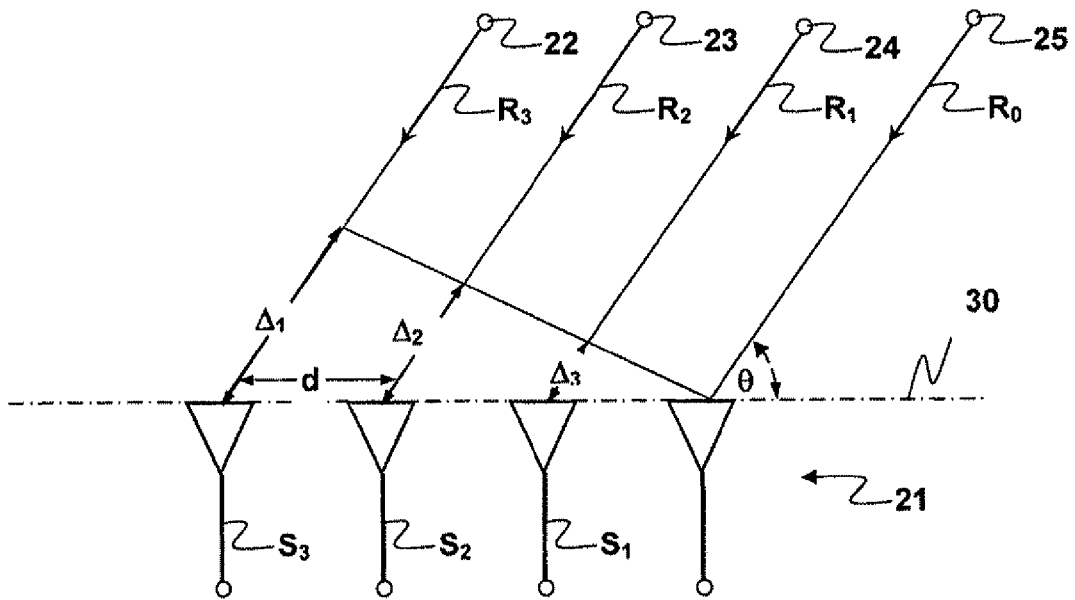
FIG. 2 shows a method for determining the azimuth angle and frequency of a signal source in accordance with an embodiment of the invention.

FIG. 2 shows schematically an arrangement of the antenna array 21 in which adjacent receiving antennas are aligned along an axis 30 and separated by a fixed distance d. The distance from the array 21 to a signal source detected in the surveillance space, such as the transmitters 22 to 25 is sufficiently large, in comparison to the length of the array 21 that the respective rays R from each antenna in the array to the transmitters are essentially parallel, and thus determine the same azimuth angle θ with the axis 30.

The signal that is collected in the i-th receiver $A_i$ of the receiving antenna array 21 during the n-th sample may be modeled as:

$$S_{i,n} = A \cos[2\pi f(ndt + i\Delta t) + \phi] + N_{i,n} \quad (1)$$

where:
t=time,
A=amplitude,
f=frequency of the EM radiation,
dt=time delay of the signal between samples,
Δt=time delay of signals from adjacent antennas in the array, and
$N_{i,n}$=noise in i-th antenna during the n-th sample.

The signals $S_{i,n}$ have respective time delays iΔt owing to the fact that the distance that each signal $S_{i,n}$ travels along the respective ray 32 from the transmitter to the antenna $A_i$ is different for each signal. In FIG. 2 it is seen that the distance traveled by the signal $S_i$ along the ray $R_i$ exceeds the distance traveled by the signal $S_0$ along the ray $R_0$ by an amount Δt given by:

$$\Delta t = \frac{d}{c}\cos(\theta) \quad (2)$$

where c is the velocity of the propagation of the signals and d is the fixed distance between antennas.

Referring again to FIG. 1, each antenna A receives its respective signal S that is provided to its respective receiver channel RC. The signals $S_{i,n}$ are sampled by the receivers RC at a known sampling rate, to yield a two dimensional array of sampled values:

$$S = A \cos 2\pi f[(ndt + i\Delta t) + \phi] N_i \quad (3)$$

where n is the sample number obtained using the sampling rate. For a fixed value of n, the sequence $S_{i,n}$ is a sampling of the signal emitted by the respective signal source 22 to 25 at a sampling rate equal to 1/dt.

For m simultaneous signals, this gives:

$$S_{i,n} = \sum_m [A_m \cos[2\pi f_m(ndt + i\Delta t_m) + \varphi_m] + N_{i,n}] \quad (4)$$

In one embodiment, the values of $S_{i,n}$ are binarized by setting $S_{i,n}=1$ when $S_{i,n}>0$ and $S_{i,n}=-1$ when $S_{i,n}\leq 0$. Binarizing the signals simplifies the hardware and software since a particular benefit of the invention over hitherto proposed approaches is that the invention is able to detect weak signals, which individually are indistinguishable from noise. Any benefit in attempting to assign a multibit value to a signal that is of such small magnitude that it is indistinguishable from noise is insignificant and generally offset by the greater simplicity in the hardware and processing that can be achieved by to binarizing the signals. On the other hand, when the dynamic range of simultaneous multi-signals is required, multibit processing may be preferable using fewer antennas so as to reduce processing complexity.

The two dimensional array $S_{i,n}$ is input to an azimuth determination processing stage 11. The azimuth determination processing involves calculating a two dimensional Fourier transform of the array $S_{i,n}$. The Fourier transform, referred to herein as a "frequency-azimuth plot", is a two-dimensional array $F_{jk}$. j is a bin number satisfying:

$$f = \frac{j \cdot \text{clock}}{N} \quad (5)$$

where f is the possibly unknown frequency of the EM radiation and N is the number of bins of this dimension. k is a bin number satisfying:

$$f = \frac{k \cdot (1/dt)}{N'} \quad (6)$$

where N' is the number of bins of this dimension.
Substituting Equation (2) into Equation (6) yields:

$$f = \frac{k \cdot c}{N' \cdot d\cos\theta} \quad (7)$$

or equivalently, $$\theta = \text{Arccos}\left(\frac{k \cdot c}{N' \cdot d \cdot f}\right) \quad (8)$$

The array $F_{jk}$ is scanned in the azimuth determination processing stage 11 for peaks satisfying one or more predetermined criteria in order to identify signals emitted by the signal sources 22 to 25 in the surveillance space and to segregate these signals from clutter. The predetermined criteria may include, for example, peak amplitude above a predetermined threshold. The frequency f of each identified signal source is determined from the bin number j of the peak using Equation (5). This produces a value of f whose accuracy is determined by the number of bins N. The accuracy of the frequency determination can often be improved by using phase data, as is known in the art of Fourier analysis. In order to deal with the problem of frequency ambiguity, the method of the invention may be performed at least twice using different values of "clock" and/or by using an RF filter. Once the frequency is known, the azimuth angle θ of the signal source is then determined from the bin number k of the peak using Equation (7). The output 26 of the processing stage 11 includes the azimuth angle for each detected signal and optionally the frequency of each detected signal.

Figure 3:
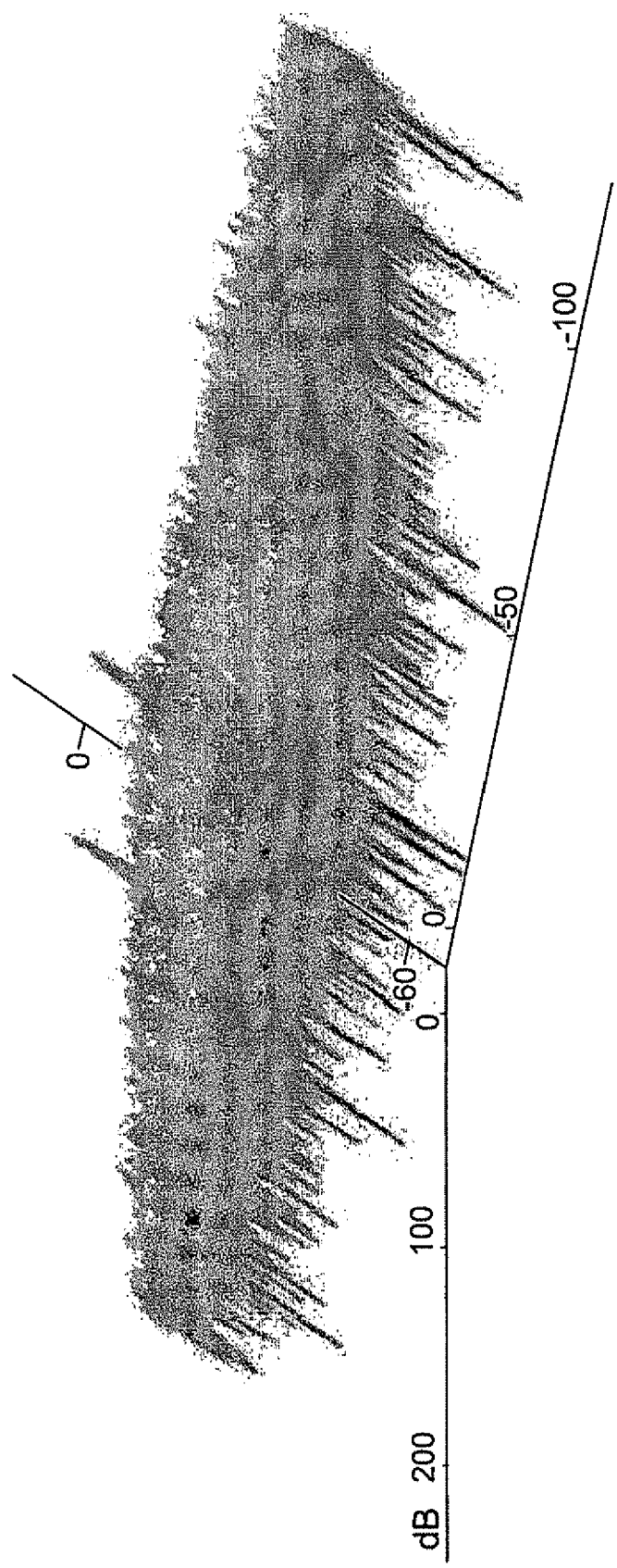
FIG. 3 shows a two-dimensional time-distance plot obtained by one embodiment of the method of the invention.

FIG. 3 shows a two-dimensional frequency-azimuth plot 35 obtained on real data by the method of the invention. The data were collected using a linear array of 128 receivers. The plot was obtained using 512 signal samples. The plot 35 has two peaks 36 and 37 corresponding to two different signal sources in the surveillance area. The peak 36 reveals a signal having a frequency of $f_1$ and an azimuth angle of 30°. This signal was detected with a signal to noise ration of −18 db. The peak 37 reveals a signal having a frequency of $f_2$ and an azimuth angle of 50°. This signal was detected with a signal to noise ratio of −20 db. Increasing the number of detectors in the array enhances sensitivity.

Figure 4:
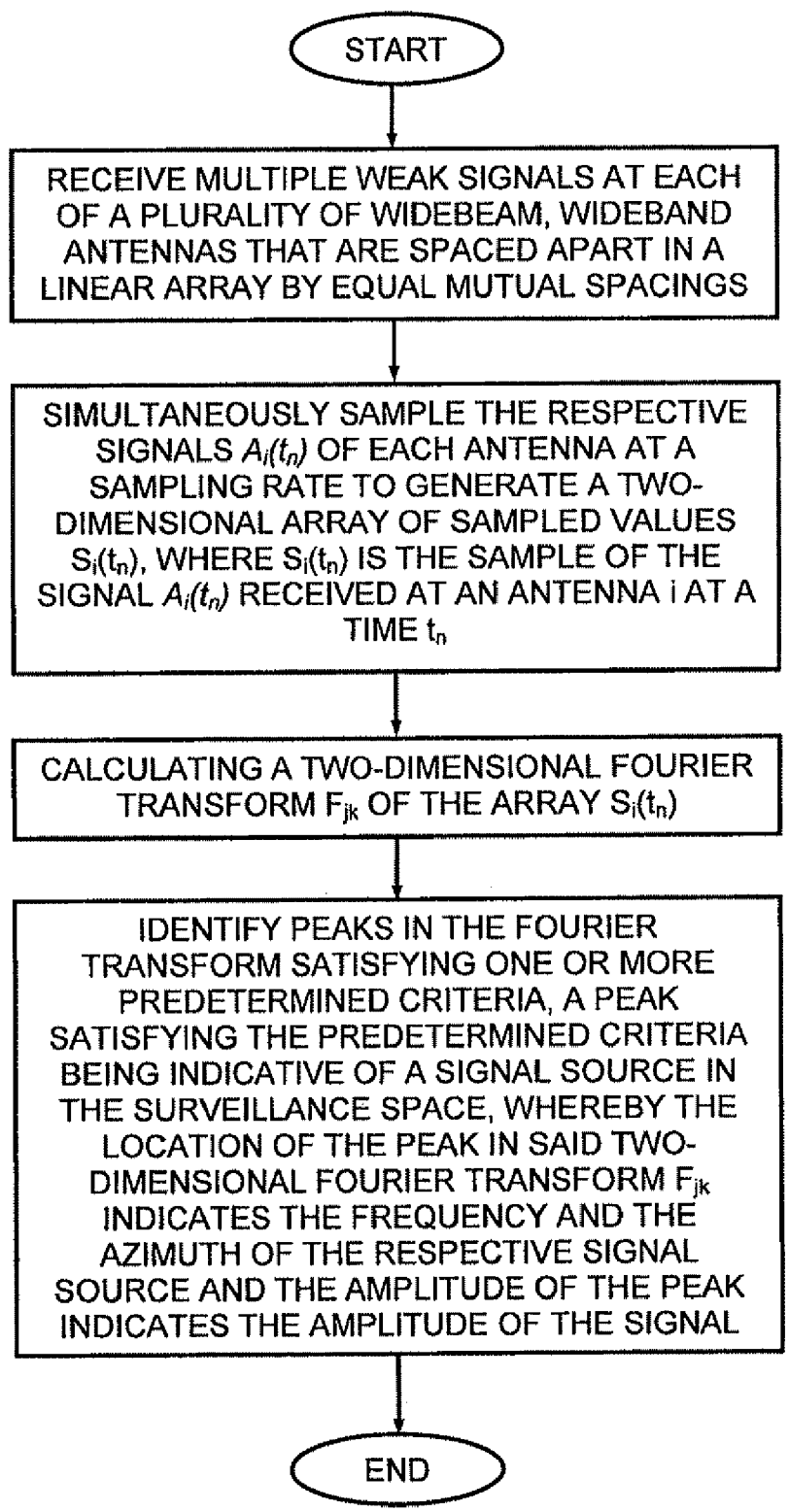
FIG. 4 is a flow diagram showing the principal operations carried out by a surveillance system for determining the azimuth angle and frequency of a signal source in accordance with an embodiment of the invention.

FIG. 4 is a flow diagram summarizing the principal operations carried out in accordance with an embodiment of the invention for determining the azimuth angle and frequency of a signal source as described above with particular reference to FIGS. 1 to 3.

It should be noted that the system of the invention may be implemented using more than one array of receiving antennas. For example, the invention may be implemented using two mutually perpendicular arrays of receiving antennas. An additional Fourier transform of the two-dimensional Fourier transform $F_{jk}$ then generates, for each identified emitter, two independent angles (azimuth and elevation) that together define a position vector of the signal source.

It will also be appreciated that the signal source need not be an active transmitter but could, for example, be a reflected signal.

It will also be appreciated that since the signals detected by the detector array according to the invention are spatially separated in two-dimensional space, signals having identical frequencies but spaced apart in two-dimensional space will be discretely detected.

Also, once the frequency and direction of a transmitter have been determined using FFT, Discrete Fourier Transform may be employed to track the detected transmitter thus saving processing time.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for determining a respective electromagnetic parameter and spatial disposition of one or more signal sources in a surveillance space simultaneously bombarded by multiple signals, the method comprising:
    receiving said multiple signals at each of a plurality of widebeam, wideband antennas that are spaced apart in a linear array by equal mutual spacings;
    simultaneously sampling the respective signals $S_{i,n}$ of each of the antennas at a sampling rate to generate a two-dimensional array of sampled values $S_{i,n}$, where $S_{i,n}$ is the n-th sample of the signal received at an antenna i;
    calculating a two-dimensional Fourier transform $F_{jk}$ of the array $S_{i,n}$; and
    identifying peaks in the Fourier transform satisfying one or more predetermined criteria, a peak satisfying the predetermined criteria being indicative of a signal source in the surveillance space, whereby the location of the peak in said two-dimensional Fourier transform $F_{jk}$ indicates the frequency and the azimuth of the respective signal source and the amplitude of the peak indicates the amplitude of the signal source.

2. The method according to claim 1, including calculating the frequency of the radiation emitted by the signal source indicated by an identified peak satisfying the one or more predetermined criteria, using an algebraic involving the sampling rate.

3. The method according to claim 2, including calculating the frequency of the radiation emitted by the signal source indicated by the identified peak using the algebraic expression $$f = \frac{j \cdot \text{clock}}{N},$$

where f is the frequency of the radiation, j is a bin number of the peak and N is a number of bins.

4. The method according to claim 1, including calculating an azimuth angle of the signal source indicated by an identified peak satisfying the one or more predetermined criteria.

5. The method according to claim 4, wherein the azimuth angle of the signal source is calculated using an algebraic expression involving the frequency f of the radiation emitted by the signal source.

6. The method according to claim 5, wherein the azimuth angle θ of the signal source indicated by the peak is calculated using the algebraic expression $$\theta = \text{Arccos}\left(\frac{k \cdot c}{N' \cdot d \cdot f}\right),$$

where c is the velocity of the radiation, k is a bin number of the peak and N' is a number of bins.

7. The method according to claim 1, wherein the values of $S_{i,n}$ are set to 1 when $S_{i,n} > 0$ and to −1 when $S_{i,n} \leq 0$.

8. The method according to claim 1, wherein the multiple signals are received by a two-dimensional array of antennas such that along each of two mutually perpendicular axes respective ones of said antennas are spaced apart in a linear array by equal mutual spacings;

the method further including:

computing an additional Fourier transform of said two-dimensional Fourier transform $F_{jk}$ so as to compute a three-dimensional Fourier transform that also provides elevation of each respective signal source.

9. A computer program comprising computer program code means for performing the method of claim 1 when said program is run on a computer.

10. A computer program as claimed in claim 9 embodied on a computer readable medium.

11. The method according to claim 1, wherein said calculating a two-dimensional Fourier transform comprises calculating a first Fourier transform of the array $S_{i,n}$ and calculating a second Fourier transform of the transformed array.

12. A system for determining a respective electromagnetic parameter and spatial disposition of one or more signal sources in a surveillance space simultaneously bombarded by multiple signals, the system comprising:

an antenna array having a plurality of spaced apart wide-beam, wideband antennas that are spaced apart in a linear array by equal mutual spacings and are configured to receive said multiple signals;

and a processor coupled to the antenna array and being configured to:

sample the respective signals $S_{i,n}$ received by each of the antennas at a sampling rate to generate a two-dimensional array of sampled values $S_{i,n}$, where $S_{i,n}$ is the n-th sample of the signal received at a detector i;

calculate a two-dimensional Fourier transform $F_{jk}$ of the array $S_{i,n}$; and identify peaks in the Fourier transform satisfying one or more predetermined criteria, a peak satisfying the predetermined criteria being indicative of a signal source in the surveillance space, whereby the location of the peak in said two-dimensional Fourier transform $F_{jk}$ indicates the frequency and the azimuth of the respective signal source and the amplitude of the peak indicates the amplitude of the signal source.

13. The system according to claim 12, wherein the processor is further configured to calculate, for an identified peak satisfying the one or more predetermined criteria, the frequency of the radiation emitted by the antennas indicated by the peak using an algebraic involving the sampling rate.

14. The system according to claim 13, wherein the antennas are arranged in a linear array having a uniform spacing d between adjacent detectors, and wherein the processor is configured to calculate the frequency of the radiation emitted by the signal source indicated by the peak using the algebraic expression $$f = \frac{j \cdot clock}{N},$$

where f is the frequency of the radiation, j is a bin number of the peak and N is a number of bins.

15. The system according to claim 12, wherein the processor is further configured to calculate, for an identified peak satisfying the one or more predetermined criteria, an azimuth angle of the signal source indicated by the peak.

16. The system according to claim 15, wherein the processor is configured to calculate the azimuth angle of the signal source using an algebraic expression involving the frequency f of the radiation emitted by the signal source.

17. The system according to claim 16, wherein the processor is configured to calculate the azimuth angle $\theta$ of the signal source indicated by the peak using the algebraic expression $$\theta = \text{Arccos}\left(\frac{k \cdot c}{N' \cdot d \cdot f}\right),$$

wherein c is the velocity of the radiation, k is a bin number of the peak and N' is a number of bins.

18. The system according to claim 12, wherein the values of $S_{i,n}$ are set to 1 when $S_{i,n} > 0$ and to $-1$ when $S_{i,n} \leq 0$.

19. The system according to claim 12, wherein said processor is configured to calculate a first Fourier transform of the array $S_{i,n}$ and to calculate a second Fourier transform of the transformed array.

* * * * *